Aug. 17, 1937.　　　D'ARCY A. YOUNG, JR　　　2,090,017
STEREOCAMERA
Filed Nov. 13, 1936
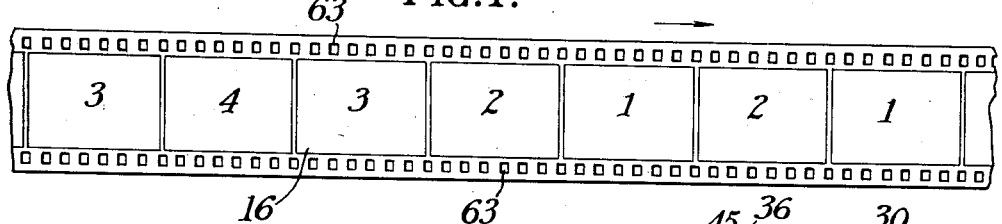
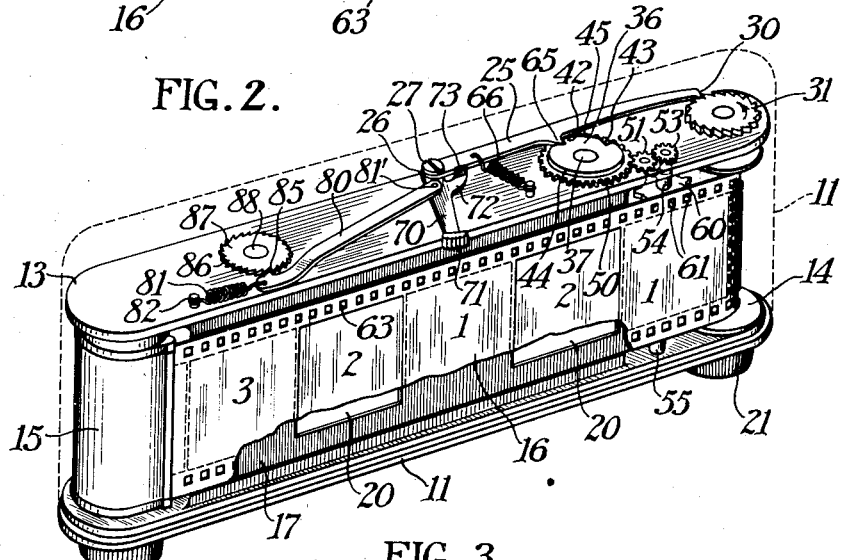
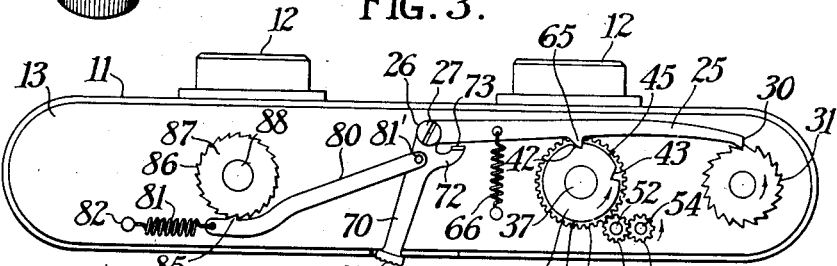
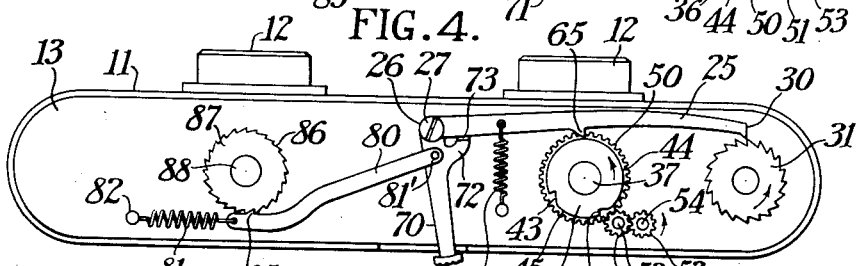
D'Arcy A. Young, Jr.
INVENTOR.
BY
ATTORNEYS Patented Aug. 17, 1937

2,090,017

UNITED STATES PATENT OFFICE 2,090,017

STEREOCAMERA

D'Arcy A. Young, Jr., Rochester, N. Y., assignor to Eastman Kodak Company, Rochester, N. Y., a corporation of New Jersey Application November 13, 1936, Serial No. 110,698

13 Claims. (Cl. 95—18)

This invention relates to photographic roll film cameras, and more particularly to cameras of the class which are adapted to take pairs of stereo pictures.

An object of the invention is the provision of a roll film stereo-camera in which the strip of sensitized film is arranged to provide pairs of picture frames corresponding to minimum waste of the film strip. Another object of the invention is the provision in a camera of this class of a control means for automatically arresting the film movement when the latter has been moved the proper distance to bring a pair of picture frames into exposing position. Still another object of the invention is the provision of an automatic film measuring device for a stereoscopic apparatus. A further object of the invention is the provision of such control means which is simple in construction, inexpensive to manufacture and effective in use.

To these and other ends, the invention resides in certain improvements and combinations of parts all as will be hereinafter more fully described, the novel features being pointed out in the claims at the end of the specification.

In the drawing:

Fig. 1 is a view of a film strip showing the arrangement of the pairs of picture frames which correspond to minimum waste of the film strip.

Fig. 2 is a perspective view of the camera constructed in accordance with the preferred embodiment of the invention, showing the operating members positioned to lock the take-up spool after the second pair of picture frames have been moved to exposing position.

Fig. 3 is a plan view of the camera illustrated in Fig. 2, showing the members in position to lock the take-up spool when the third pair of picture frames have been moved into exposing position.

Fig. 4 is a view similar to Fig. 3 showing the members moved to an inoperative position to permit rotation of the take-up spool to wind the exposed picture frames thereon.

The same reference numerals throughout the several views indicate the same parts.

The present invention comprises a film measuring and control device for use with a stereo apparatus such as a camera or a projector. The invention is embodied in the present instance, by way of illustration, in a camera which comprises, in general, a body having a film casing or compartment in one end of which is positioned a supply spool on which is wound a strip of sensitized film. The take-up spool is preferably positioned in the opposite end of the film casing, and is adapted to be rotated to wind the exposed film thereon, and to bring unexposed picture frames to exposing position, as is well known. When the film has been moved the proper distance to bring the new picture frames into exposing position, the take-up spool is automatically locked against further rotation. After the exposure has been made, the locking means is temporarily moved to inoperative position to permit winding of the exposed film onto the take-up spool. When, however, the take-up spool has been rotated sufficiently to bring the new picture frames into exposing position, the take-up spool is again automatically locked against further rotation.

With stereo cameras for hand use, it is customary to supply a lens separation and a picture frame separation equal to the normal observer's interocular distance. If standard 35 mm. motion picture film is to be used in such a camera, it has been found that the frame size corresponding to minimum waste and maximum frame size is seven perforation holes long. In order to use this desirable size, however, it is necessary to arrange the pairs of picture frames in such a manner that after the first exposure, the film is moved one frame only to bring the second pair of picture frames into position. After the second exposure, however, the film is moved a distance of three frames to bring the third pair of picture frames into exposing position. This alternate movement of first one frame and then three frames is continued for each alternate pair of picture frames throughout the entire strip.

In order to secure these desirable features, the present invention provides a film strip on which the pairs of picture frames are preferably arranged, in the manner illustrated in Fig. 1. It is apparent from inspection of Figs. 1 and 2 that when the frames 1—1 are in exposing position, the film must be moved only one picture frame to bring the adjacent picture frames 2—2 into exposing position; but it is then necessary to move the film three frames to bring the frames 3—3 into position, then one frame to bring the frames 4—4 into position, etc. This alternate movement of one and then three frames is continued for the entire strip of film. It is evident from the above, that successive pairs of picture frames are brought into position by alternately advancing the film strip one frame and then an odd multiple of one frame.

While the present embodiment is shown in connection with 35 mm. film this is by way of illustration only, as it is contemplated that the general idea may be used with films of varying width without departing from the spirit of the invention or the scope of the appended claims.

The above described film strip is intended for use in a stereo-camera having a body 11 on the front of which a pair of suitably spaced lenses 12 are mounted. The body 11 is formed with a partition 13 extending the full length thereof and dividing the interior of the body into a small mechanism compartment, hereinafter described, and a large compartment or casing which houses a take-up spool 14, and a film retort 15 in which a strip of sensitized film 16 is wound. The film 16 is guided from the film retort 15 to the take-up spool 14 over a flat plate or film guide 17 having a pair of spaced apertures 20 in alignment with the lenses 12 whereby two picture frames may be exposed at a time, all of which is well known in the art. A suitable knob 21 is provided for rotating the take-up spool 14 to wind the exposed film thereon.

In order to bring successive pairs of picture frames into alignment with the apertures 20, the film strip is alternately moved one and then three picture frames, as pointed out above, by turning the knob 21 secured to the take-up spool 14. This winding cycle is preferably accomplished automatically, thus entirely relieving the user of the camera from the necessity of properly registering the film for exposure. To this end, the present invention provides a novel means for arresting the movement of the film when the latter has been moved the proper number of picture frames.

This arresting means, in the present embodiment, is in the form of a lever or blocking arm 25 pivoted at 26, by means of the screw 27, to the partition 13, as clearly illustrated in Figs. 2, 3, and 4. The free end of this lever 25 is formed to provide a pawl 30 arranged to be brought into locking engagement with a ratchet 31 connected to and rotatable with the take-up spool 14. When the pawl 30 is in engagement with the ratchet 31, as illustrated in Figs. 2 and 3, the take-up spool 14 is locked against rotation in the direction of the arrow. When, however, pawl 30 is moved out of engagement with the ratchet 31, as shown in Fig. 4, the spool 14 may be rotated to wind the film 16 thereon.

A cam 36 is rotatably mounted on a stud 37 suitably secured to the partition 13, and is provided with two peripheral notches 42 and 43. These notches are so positioned that the greater distance 44 therebetween is three times the lesser distance 45, as is apparent from an inspection of the drawing. The cam 36 is rotated, by mechanism hereinafter described, at such a rate relative to the film movement that the lesser distance 45 corresponds to a movement of one picture frame of the film 16, and the larger distance 44 corresponds with the movement of three picture frames thereof.

The lower face of the cam 36 is formed with a gear 50 which meshes with an intermediate gear 51 mounted on the stud 52 secured to the partition 13 in any suitable or well known manner. The gear 51 in turn meshes with another gear 53 which is mounted on and rotates with a shaft 54 which projects through and is journaled in the partition 13. This shaft extends across the large compartment in front of the film, and has the opposite end thereof journaled in the side wall 55 of the camera body, as clearly illustrated in Fig. 2.

A sprocket 60 having a plurality of teeth 61, in the present instance seven, is mounted on the shaft 54 adjacent the partition 13 in such a manner that the teeth 61 will engage the marginal perforations 63 of the film 16 when the latter is moved by the take-up spool 14. By means of this arrangement, the rotation of the sprocket 60 will be in a definite relation to the movement of the film 16, as will be apparent from inspection of the drawing. As the gears 50, 51, and 53 operatively connect the sprocket 60 with the cam 36, it is evident that the latter will also be rotated in a definite relation to the film movement. The gears are so proportioned that a movement of four picture frames will cause one complete revolution of the cam 36.

After the first exposure has been made on the picture frames designated as 1—1, the take-up spool 14 is rotated to move the frames 2—2 into exposing position in front of the apertures 20. As this change requires a film movement equal to the length of only one picture frame, the cam 36 is rotated one-quarter of a turn, which represents the lesser distance 45 between the notches 42 and 43, thus bringing the notch 43 to registry with a dog 65 formed on the lever 25. When this position is reached, the dog 65 will automatically drop into the notch 43, under the action of the spring 66, and the pawl 30 will fall into the ratchet 31, thus preventing further winding or rotation of the take-up spool 14.

When, however, the frames 2—2 have been exposed, it is necessary to move the film 16 a distance equal to the length of three picture frames which will thus rotate the cam 36 the greater distance 44 between the notches 42 and 43, as is evidenced on inspection of Figs. 2 and 3. When the cam 36 has thus been rotated, the notch 42 is brought into registry with the dog 65 so that the latter will automatically drop into the notch 42 causing the pawl 30 to again engage in ratchet 31 to prevent further rotation of the take-up spool 14. It is thus apparent that the various pairs of picture frames may be moved into exposing position; and, when properly positioned, the movement of the film is then automatically arrested. Such a construction thus not only assures proper registration of the picture frames, but also relieves the camera user from the necessity of properly registering the picture frames for exposure.

When an exposure has been made, it is necessary that the exposed picture frames be wound onto the take-up spool 14, and that the two unexposed frames be simultaneously moved to exposing positions behind the apertures 20. To secure this result, it is necessary to temporarily move the pawl 30 out of engagement with the ratchet 31 to permit the turning of the take-up spool 14.

This moving mechanism comprises, in the present embodiment, a lever 70 one end of which is pivoted by means of the screw 27 to the partition 13. The lever 70 extends transversely of the partition 13 to a point exteriorly of the body 11 and has the free end thereof formed to provide a roughened finger operating portion 71. An L-shaped arm 72 extends laterally from the lever 70, intermediate the end thereof, and has a lug 73 arranged to engage the pivoted arm 25 to move the latter to inoperative position as shown in Fig. 4. It is apparent from an inspection of Figs. 2, 3, and 4, that when the arm 70 is moved in a counter-clockwise direction, the lug 73 will push the dog 65 out of the notch on the cam 36 and the pawl 30 out of engagement with the ratchet 31, after which a small movement of the spool 14 places the dog 65 on the high part or control surface of the cam 36, as clearly shown in Fig. 4. The lever 70 is then released and the winding of the spool 14 continues until the dog 65 again registers with one of the notches 42 or 43 on the cam 36, at which time the dog 65 automatically drops into the notch and the pawl 30 moves into engagement with the ratchet 31, as above described.

By means of this arrangement, the film may be readily wound after an exposure has been made, and after the proper movement has taken place, the film movement is automatically arrested, thus entirely removing the task of registration from the camera user. This construction also avoids the use of paper backing for the film, as well as the usual viewing window in the camera back.

Each time the lever 70 is moved it carries with it a link 80, one end of which is pivoted at 81' to lever 70. A spring 81 has one end thereof secured to a post 82 mounted in upright position on the partition 13, and the other end fastened to the free end of the link 80 and tending to move the latter, as well as the lever 70, to the left as viewed in Figs. 2 and 3. A projection or pawl 85 on the link 80 engages teeth 86 on a ratchet 87 rotatably mounted on a stud 88 secured to the partition 13. Each movement of the lever 70 is such that it rotates the ratchet 87 an angular distance of one tooth. The ratchet 87 thus constitutes a counter of the number of exposures made, graduations for film exposures being scribed on a visible surface of the ratchet. When the lever 70 is released, the spring 81 moves the link 80 and the lever 70 to the left as shown in Figs. 2 and 3.

It is apparent from the above description, that the present invention provides a novel film operating mechanism which not only assures a minimum of film waste, but also arrests the winding operation automatically so that the task of proper registration is entirely removed for the camera user. In addition, the above construction also avoids the use of paper backing for the film as well as the usual viewing window in the back of a camera.

While one embodiment of the invention has been disclosed, it is to be understood that the inventive idea may be carried out in a number of ways. This application is, therefore, not to be limited to the precise details described, but is intended to cover all variations and modifications thereof falling within the spirit of the invention and the scope of the appended claims.

I claim:—

1. In a photographic camera for taking stereoscopic pictures, the combination with an exposure frame provided with exposure apertures which are spaced an interocular distance, a film moving means including a take-up film roll for drawing a film strip over said exposure apertures, and a locking means including a clutch member connected to rotate with said film roll and including a blocking member normally engaging said clutch member to prevent take-up movement of said film roll, of a measuring means including a film engaging member operated by movement of said film strip and including a control member operated by said film engaging member and having a control surface for engaging said blocking member to hold the same out of engagement with said clutch member during movement of said film strip a distance equal to one exposure frame and alternatively during movement of said film strip through a distance which is a multiple of said exposure frame.

2. In a photographic camera for taking stereoscopic pictures, the combination with an exposure frame provided with exposure apertures which are spaced an interocular distance, a film moving means including a take-up film roll for drawing a film strip over said exposure apertures, and a locking means including a clutch member connected to rotate with said film roll and including a blocking member normally engaging said clutch member to prevent take-up movement of said film roll, of a measuring means including a film engaging member operated by movement of said film strip and including a control member operated by said film engaging member and having spaced portions for permitting engagement of said blocking member with said clutch after movement of the film strip a distance of one frame and alternatively after movement of the film strip a multiple of one frame.

3. In a photographic camera for taking stereoscopic pictures, the combination with an exposure frame provided with exposure apertures which are spaced an interocular distance, a film moving means including a take-up film roll for drawing a film strip over said exposure apertures, and a locking means including a clutch member connected to rotate with said film roll and including a blocking member normally engaging said clutch member to prevent take-up movement of said film roll, of a measuring means including a film engaging member operated by movement of said film strip and including a control member operated by said film engaging member and having a control surface for engaging said blocking member to hold the same out of engagement with said clutch member during movement of said film strip a distance equal to one exposure frame and alternatively during movement of said film strip through a distance which is a multiple of said exposure frame, and means associated with said control member whereby said blocking member is automatically moved to lock said clutch against further rotation when said film strip is alternatively moved said one and said multiple of one picture frame.

4. In a photographic camera for taking stereoscopic pictures, the combination with an exposure frame provided with exposure apertures which are spaced an interocular distance, a film moving means including a take-up film roll for drawing a film strip over said exposure apertures, and a locking means including a clutch member connected to rotate with said film roll and including a blocking member normally engaging said clutch member to prevent take-up movement of said film roll, of a measuring means including a film engaging member operated by movement of said film strip and including a control member operated by said film engaging member and having spaced portions for permitting engagement of said blocking member with said clutch after movement of the film strip a distance of one frame and alternatively after movement of the film strip a multiple of said one frame, said control member having control surfaces intermediate said portions for engaging said blocking member to hold the latter out of engagement with said clutch member during movement of said film strip a distance equal to one exposure frame and alternatively during movement of said film strip through a distance which is a multiple of said exposure frame, said portions permitting said blocking member to engage said clutch to prevent take-up movement of said film roll when the film strip has been moved said one frame or said multiple of said one frame.

5. In a photographic camera for taking stereoscopic pictures, the combination with an exposure frame provided with exposure apertures which are spaced an interocular distance, a film moving means including a take-up film roll for drawing a film strip over said exposure apertures, a ratchet rotatable with said roll, locking means mounted on said camera and normally engaging said ratchet to prevent take-up movement of said roll, a measuring means engaging and operated by said film, a cam operatively connected to and operated by said measuring means, said cam having control surfaces arranged to engage said locking means to hold the latter out of engagement with said ratchet during movement of the film strip a distance equal to one exposure frame and alternatively during movement of said film strip through a distance which is a multiple of said exposure frame; and means on said cam for automatically permitting said locking means to be moved into engagement with said ratchet to prevent further take-up movement of said roll when said film strip has been moved said one picture frame or alternatively some multiple of said one picture frame.

6. In a photographic camera for taking stereoscopic pictures, the combination with an exposure frame provided with exposure apertures which are spaced an interocular distance, a film moving means including a take-up roll for drawing a film strip over said exposure apertures, a ratchet rotatable with said roll, a lever pivoted at one end to said camera and having the free end thereof normally engaging said ratchet to prevent take-up movement of said roll, a toothed wheel operated by movement of said film strip, a cam operatively connected to and rotated by said toothed wheel, said cam having a control surface arranged to engage said lever to hold the latter out of engagement with said ratchet during movement of the film strip through a distance of one picture frame, a second control surface on said cam for holding the lever out of contact with said ratchet during movement of the film strip through a distance which is a multiple of said one frame, and portions on said cam which permit movement of said lever whereby the latter is brought into engagement with said ratchet when said film has been moved said one frame or said multiple of one frame to arrest movement of said film.

7. In a photographic camera for taking stereoscopic pictures, the combination with an exposure frame provided with exposure apertures which are spaced an interocular distance, a film moving means including a take-up film roll for drawing a film strip over said exposure apertures, and a locking means including a clutch member connected to rotate with said film roll and including a blocking member normally engaging said clutch member to prevent take-up movement of said film roll, of a measuring means including a film engaging member operated by movement of said film strip and including a control member operated by said film engaging member and having a control surface for engaging said blocking member to hold the same out of engagement with said clutch member during movement of said film strip a distance equal to one exposure frame and alternatively during movement of said film strip through a distance which is a multiple of said exposure frame, and a manually operated member for initially moving said blocking member out of engagement with said clutch member after which said blocking member is supervised by said control member.

8. In a photographic camera for taking stereoscopic pictures, the combination with an exposure frame provided with exposure apertures which are spaced an interocular distance, a film moving means including a take-up film roll for drawing a film strip over said exposure apertures, and a locking means including a clutch member connected to rotate with said film roll and including a blocking member normally engaging said clutch member to prevent take-up movement of said film roll, of a measuring means including a film engaging member operated by movement of said film strip and including a control member operated by said film engaging member and having spaced portions for permitting engagement of said blocking member with said clutch after movement of the film strip a distance of one frame and alternatively after movement of the film strip a multiple of said one frame, said control member having control surfaces intermediate said portions for engaging said blocking member to hold the latter out of engagement with said clutch member during movement of said film strip a distance equal to one exposure frame and alternatively during movement of said film strip through a distance which is a multiple of said exposure frame, said portions permitting said blocking member to engage said clutch to prevent take-up movement of said film roll when the film strip has been moved said one frame or said multiple of said one frame, and a manually operated lever engaging said blocking member and arranged to move the latter out of engagement with said clutch member to permit initial winding of said take-up spool, after said initial winding said blocking member riding on said control surfaces.

9. In a photographic camera for taking stereoscopic pictures, the combination with an exposure frame provided with exposure apertures which are spaced an interocular distance, a film moving means including a take-up film roll for drawing a film strip over said exposure apertures, a ratchet rotatable with said roll, locking means mounted on said camera and normally engaging said ratchet to prevent take-up movement of said roll, a measuring means engaging and operated by said film, a cam operatively connected to and controlled by said measuring means, said cam having control surfaces arranged to engage said locking means to hold the latter out of engagement with said ratchet during movement of the film strip a distance equal to one exposure frame and alternatively during movement of said film strip through a distance which is a multiple of said exposure frame, means on said cam for automatically permitting said locking means to be moved into engagement with said ratchet to prevent further take-up movement of said roll when said film strip has been moved said one picture frame or alternatively said multiple of one picture frame, and a manually operated lever having a part thereof arranged to engage said locking means to temporarily throw the latter out of engagement with said ratchet to permit initial movement of said take-up spool after which the locking means is arranged to ride on said control surfaces until the film has been moved said one or said multiple of said one frame whereupon said locking means registers with said last mentioned means to permit said locking means to be moved to engage said ratchet to arrest the movement of said film strip.

10. In a photographic camera for taking stereoscopic pictures, the combination with an exposure frame provided with exposure apertures which are spaced an interocular distance, a film moving means including a take-up film roll for drawing a film strip over said exposure apertures, a ratchet rotatable with said roll, a lever pivoted at one end of said camera and having the free end thereof normally engaging said ratchet to prevent take-up movement of said roll, a toothed wheel operated by movement of said film strip, a cam operatively connected to and rotated by said toothed wheel, said cam having a control surface arranged to engage said lever to hold the latter out of engagement with said ratchet during movement of the film strip through a distance of one picture frame, a second control surface on said cam for holding the lever out of contact with said ratchet during alternate movement of the film strip through a distance which is a multiple of said one frame, portions on said cam which permit movement of said lever whereby the latter is brought into engagement with said ratchet when said film has been moved said one frame or said multiple of one frame, and a member pivotally mounted on said camera and having a laterally extending portion arranged to engage said lever adjacent its pivot point whereby said lever may be momentarily manually moved out of engagement with said ratchet to permit initial movement of said take-up spool, after the film has been moved a slight distance said lever will ride on said control surfaces.

11. In apparatus for use in stereoscopic work, the combination with a pair of apertures spaced in interocular distance, mechanism adapted to measure perforated film and to move said film past said spaced apertures, including a sprocket engaging perforations in the film, a measuring device operatively connected to said sprocket, a blocking member, a blocking lever adapted to engage said member and said measuring device, means on the measuring device for operating the blocking member alternately for winding film areas of first one and then three areas at a time of a size approximately equal to one of the spaced apertures, and means for moving the film past said apertures.

12. In apparatus for use in stereoscopic work, the combination with a pair of apertures spaced an interocular distance, mechanism adapted to measure perforated film and to move said film past said spaced apertures, including a sprocket engaging perforations in the film, a measuring device operatively connected to said sprocket, a blocking member, a blocking lever adapted to engage said member and said measuring device to arrest movement of said film, means associated with said lever for moving said lever out of engagement with said member to permit movement of said film first one and then three picture areas of a size approximately equal to one of the spaced apertures, and means for moving the film past the apertures.

13. In apparatus for use in stereoscopic work, the combination with a pair of apertures spaced an interocular distance, mechanism adapted to measure perforated film and to move said film past said spaced apertures, including a sprocket engaging perforations in the film, a measuring device operatively connected to said sprocket, a blocking member, a blocking lever adapted to engage said member and said measuring device to arrest movement of said film, means including a pivoted member arranged to engage said lever to move the latter out of engagement with said member to permit movement of said film first one and then three picture areas of a size approximately equal to one of the spaced apertures, and means for moving the film past said apertures.

D'ARCY A. YOUNG, Jr.